(12) United States Patent
DeFabio, Jr.

(10) Patent No.: US 6,250,549 B1
(45) Date of Patent: Jun. 26, 2001

(54) METHOD FOR AUTHENTICATING SIGNATURES AND MEMORABILIA KIT EMPLOYING SAME

(76) Inventor: Daniel J. DeFabio, Jr., 6012 N. Clinton La., Gladstone, MO (US) 64119

( * ) Notice: Subject to any disclaimer, the term of this patent is extended or adjusted under 35 U.S.C. 154(b) by 0 days.

(21) Appl. No.: 09/098,867

(22) Filed: Jun. 17, 1998

(51) Int. Cl.⁷ .................................................. G06F 5/00
(52) U.S. Cl. ......................................... 235/380; 235/382
(58) Field of Search ............................ 386/95; 283/72; 235/380, 382, 382.5, 375

(56) References Cited

U.S. PATENT DOCUMENTS

| | | | |
|---|---|---|---|
| 4,202,626 | 5/1980 | Mayer, Jr. et al. | 355/23 |
| 4,406,539 | 9/1983 | Chamoux | 355/43 |
| 4,420,515 | 12/1983 | Amon et al. | 428/29 |
| 4,874,188 | 10/1989 | Gravisse et al. | 283/89 |
| 4,913,284 | 4/1990 | Versaci | 206/232 |
| 5,031,214 | 7/1991 | Dziewit et al. | 380/23 |
| 5,189,700 | 2/1993 | Blandford et al. | 380/23 |
| 5,191,613 | 3/1993 | Graziano et al. | 380/25 |
| 5,195,133 | 3/1993 | Kapp et al. | 380/9 |
| 5,208,858 | 5/1993 | Vollert et al. | 380/43 |
| 5,267,756 | 12/1993 | Molee et al. | 283/86 |
| 5,306,049 | 4/1994 | Schireck | 283/74 |
| 5,380,047 | 1/1995 | Molee et al. | 283/86 |
| 5,496,071 | 3/1996 | Walsh | 283/70 |
| 5,544,255 | 8/1996 | Smithies et al. | 382/119 |
| 5,647,017 | 7/1997 | Smithies et al. | 382/119 |
| 6,106,020 | * 8/2000 | Leef et al. | 235/380 X |

* cited by examiner

*Primary Examiner*—Karl D. Frech
(74) *Attorney, Agent, or Firm*—Shook, Hardy & Bacon L.L.

(57) ABSTRACT

A system and method for authenticating a signature on an originally signed article employs at least one camera for capturing an image of an individual when actually signing the article. In one embodiment, the image is a real-time video image, and in another embodiment, the image is a still photo. The images associated with the signed article, so that a holder of the article has a mechanism by which to authenticate the signature. Preferably, the signed article has a unique identifier located thereon, and the image is preferably edited to also include that identifier. A memorabilia kit, containing an originally signed article, a storage medium having stored thereon a captured image of an original signing event associated with the article, is also provided. Additionally, a captured image and data indicative of the signed article are stored electronically in association with each other, such as on a storage medium made available to a holder of the signed article, or in a data base which is accessible remotely.

10 Claims, 2 Drawing Sheets

METHOD FOR AUTHENTICATING SIGNATURES AND MEMORABILIA KIT EMPLOYING SAME

BACKGROUND OF THE INVENTION

1. Field of the Invention

The present invention is generally directed to a system for authenticating signatures, such as autographs. More particularly, the invention is directed to a system for capturing an image of an individual signing an article, and a resulting product including the captured image and the signed article.

2. Description of the Related Art

Obtaining and collecting originally autographed or signed articles is increasingly popular, and an entire industry is now devoted to providing articles originally signed by notable individuals. Unfortunately, with the demand for originally signed and autographed articles being very high, and the supply of these unique, originally signed articles typically being quite limited, many unscrupulous attempts are made to forge the signatures of notable individuals, such as athletes, movie, television and media professionals, artists, and the like. These attempts are made easier by the advent of technologies that facilitate copying.

While attempts to combat forgeries of autographs and signatures have been made, these attempts have enjoyed limited success and have numerous drawbacks and limitations. For example, a wide variety of equipment is available for electronically capturing a signature, so that the signature can be electronically compared with what is believed to be an actual signature of a particular individual. This type of authentication equipment, which typically utilizes an electronic pen and pad linked to a process, is expensive and often cumbersome to use. Additionally, signature-capturing devices of this type, while perhaps useful in a bank or other institutional setting, are impractical for autographs to be made on a wide variety of articles, such as clothing, posters, cards, artwork, sporting equipment, etc.

More recently, autographed articles sold with a certificate of authenticity have gained popularity. With these products, the signed articles and the certificate of authenticity bear a common identification number, and the certificate of authenticity bears a signature of a witness in conjunction with a statement to the effect that he or she witnessed the signing of the associated article. As will be immediately recognized, the drawback to this approach is that an unscrupulous trader who forged the autograph of a notable individual would have no difficulty in forging a certificate of authenticity.

Accordingly, the need exists for a simple, inexpensive and reliable method and system for authenticating signatures and autographs. The present invention fills these and other needs, while overcoming the drawbacks and limitations of prior approaches to authenticating a signature or autograph.

SUMMARY OF THE INVENTION

In a preferred method of the present invention, an article to be signed (e.g. autographed) is presented to an individual whose autograph on the article is desired. The article to be signed is any desired article, such as clothing, a sporting item, a photograph or poster, a card, etc. As the individual signs the article, an image is captured, such that the captured image illustrates the actual original signing of the article by the particular individual.

In accordance with the invention, the captured image is associated with the article so that a holder of the article can readily discern the authenticity of the autograph on the article. In one embodiment, the article to be signed is one of a numbered series and, additionally, bears a unique identification code. Preferably, the image captures the signing event, including particularly the number of the article being signed and its unique identification code.

Particularly, an authentication system of the present invention has, in a preferred embodiment, one or more cameras for capturing an image of an individual signing an article. Preferably, the cameras capture a real-time recording (including video and audio) of the individual signing an article, although it should be understood that the invention encompasses still photos as well. With editing equipment, an operator may edit the captured image to include readable information, such as the series number of the signed article and/or the article's unique identification code. Additionally, pertinent information concerning the signed article may be placed on the image or video and/or stored in a memory in conjunction with the unique identification code associated with a particular article. For example, information stored in memory and/or included on the video or image may include the name of the signing party, the date and place signing occurred, the nature of the article, the series number of the article and the total number of articles in the series, and/or information concerning the initial purchaser or holder of the article.

In one preferred embodiment of the invention, the authentication system is set up to capture images of an autograph session, during which a selected individual originally signs a number of articles. In such an arrangement as articles are signed by an individual, a real-time recording (preferably including audio and video) captures the individual signing the articles. The recording is edited such that a portion of the recording corresponding to a particular article contains information, readable upon playback of the recording, pertaining to the particular article shown in that portion of the recording. Thus, a holder of the particular signed article may view the recording and, in addition to viewing the signing of other articles signed during an autograph session, easily identify the signing of the particular article of interest.

In accordance with the broad aspects of the present invention, an image of an individual signing an article is associated with the article to permit a holder of the article to verify the authenticity of the signature on the article. Thus, according to the invention, the photograph or recording of an individual signing an article may be presented to the holder of the article, either when the holder receives the signed article, or subsequently. In the case where a real-time recording of the signing event is captured, the holder of a particular signed article may be presented with a recording of the signing of that particular article only, or a recording of the signing of a plurality of articles signed during an autograph session, including particularly the signing of the article held by the holder.

In an alternate embodiment, the association between the signed article and captured image is accomplished electronically. Particularly, an image (e.g., a still shot or real-time recording) of an individual signing an article is stored in memory in association with information indicative of, and/or pertaining to, the article. Thus, the holder of a signed article may access the memory, via a processor, such as through a communications network, and by inputting sufficient information associated with the article, view or download the captured image associated with the article.

In accordance with the invention, in order for the holder of a signed article to be able to further confirm the authenticity of the signed article, the article preferably includes some unique identifying indicia (such as an identification code and/or series number). The indicia, when visibly present on the article, is also preferably visibly present in the image that is captured of the signing event. Alternatively, a display or signage located at the location of the signing event can be updated with unique identifying indicia for each article signed. In such a case, the image that is captured of the signing event preferably also captures the display or signage, so that the unique indicia associated with the signed article is visibly present on the captured image.

As previously described, as an additional feature of the invention, the image of a signing event may be edited to itself include indicia thereon corresponding to the unique identifying indicia corresponding to the signed article that is captured in the image. Further still, the identifying indicia may also be placed on the storage medium for the recording.

In accordance with yet a further aspect of the invention, additional information, pertaining to the signing individual's accomplishments, is stored in the memory (or on the storage medium for the image) and is associated with the data indicative of a signed article and/or the captured image thereof. Similarly, additional images of the individual, such as action images (not associated with the autograph event) may be stored and retrievable in conjunction with retrieval of information and images pertaining to a signing event. Thus, for example, an athlete's statistics and/or still-shots or real-time recordings of an athletic contest in which the athlete participated can be retrieved. Similarly, information and images corresponding to a movie or media professional or star may be stored and retrieved in conjunction with retrieval of information and images pertaining to a signing event.

Accordingly, a bona fide purchaser or holder of the autographed article has a mechanism by which to subsequently authenticate the autograph, namely, by display of a photograph or by playback of the recording that captured the actual signing event.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
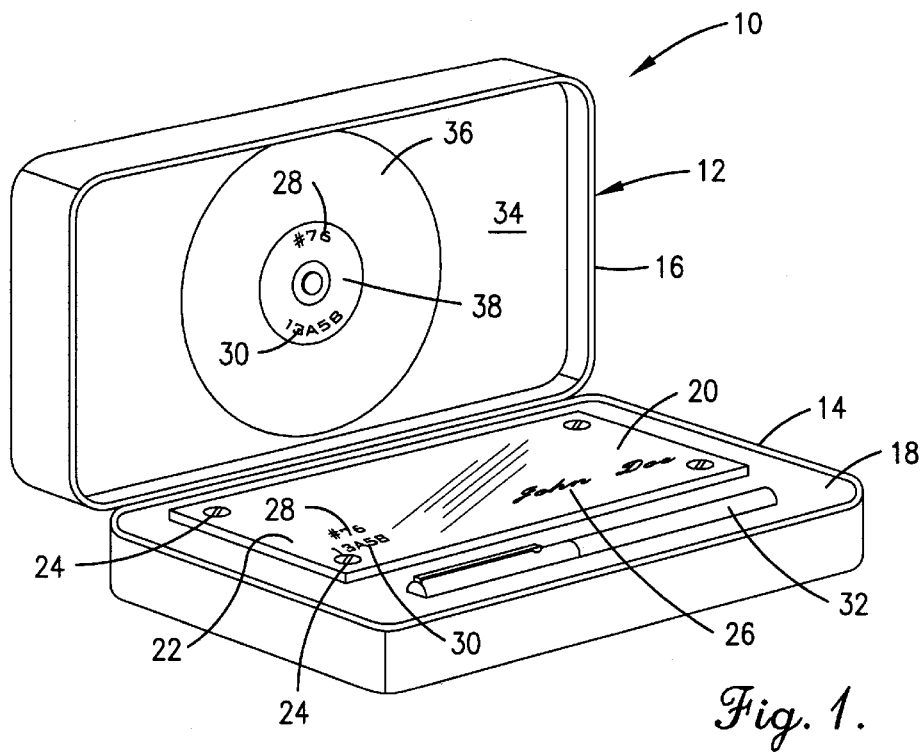
FIG. 1 is a perspective view of a memorabilia kit of the present invention, including an article originally signed by a selected individual, the writing instrument with which the article was signed, and a storage medium having recorded thereon a real-time video of the selected individual signing the article.

With initial reference to FIG. 1, a memorabilia kit of the present invention is denoted generally by reference numeral 10. The memorabilia kit has a case 12, including a base portion 14, and a lid 16. The base portion 14 forms a cavity, in which insert 18 is positioned. A signed article, denoted generally by reference numeral 20, is positioned within the case 12 and, particularly, on top of the insert 18. In the illustration shown, the article is preferably formed of paper or card stock, and is rectangular in configuration. The signed article is located under a transparent cover 22, preferably formed of plastic or glass. The article 20 and cover 22 are held in place on the insert 18 by fasteners 24.

The signed article 20 has an originally signed signature, denoted generally by reference numeral 26. For example, in the illustration of FIG. 1, an individual by the name of "John Doe" signed or autographed the article 20, as evidenced by signature 26. The signed article 20 also includes a series number denoted generally by reference numeral 28, and printed onto the article, as well as a unique identification number, denoted generally by reference numeral 30, also imprinted on the article 20. In the illustration, the series number 28 of the particular signed article 20 is "#76", and the unique identification number or code is "13A58".

Figure 4:
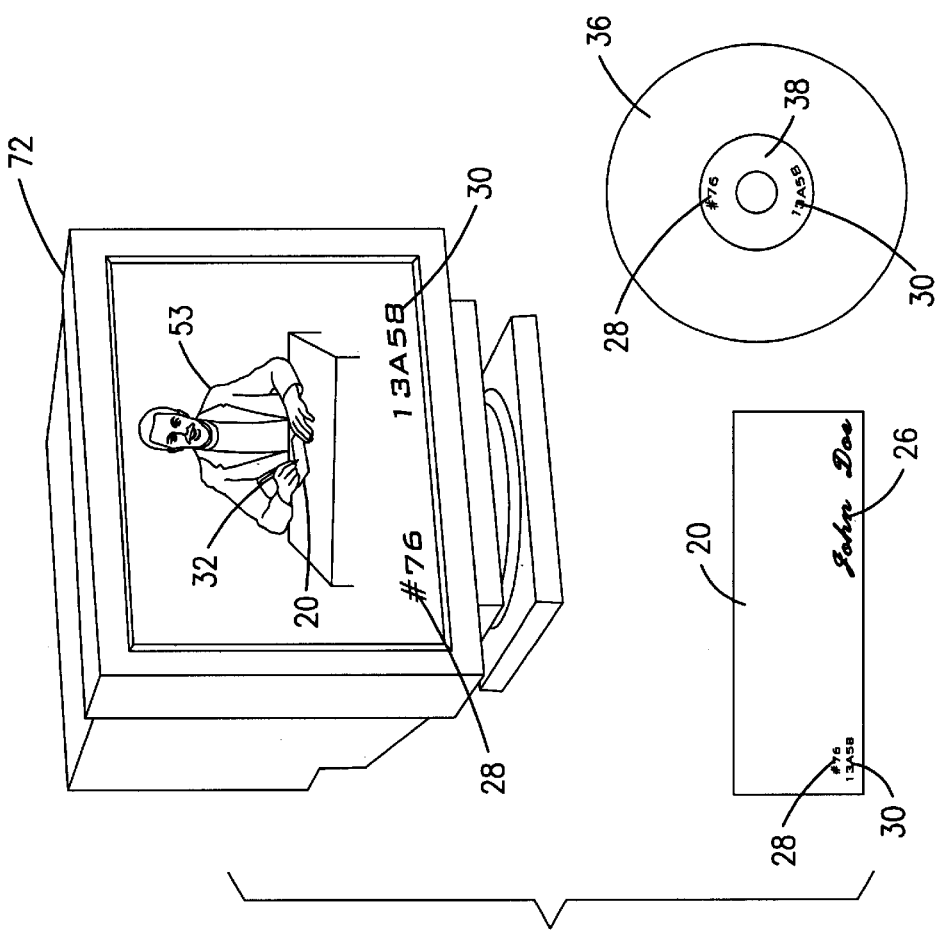
FIG. 4 illustrates playback of a real-time recording of an autograph session captured according to the principles of the present invention, including readable information pertaining to a series number and a unique identification code for the signed article, which are also placed on the article itself and on a label for the storage medium on which the recording is stored, as also illustrated.

The lid 16 has an interior surface 34, and forms a recessed cavity, into which a storage media, denoted by reference numeral 36, may be located. As illustrated, the storage media 36 is a compact disc (CD), or digital video disc (DVD), but it should be understood and appreciated that any form of storage medium may be utilized in conjunction with the principles of the present invention. The storage media 36 has a label 38. Imprinted on the label 38 is the series number, denoted by reference numeral 28, and the unique identification code, denoted by reference numeral 30. In accordance with a unique aspect of the invention, and as described in greater detail below, storage media 36 has stored thereon a recording of the actual signing event that took place when the signator, namely "John Doe", originally executed the 76th article of a series, as denoted by the signed article 20. Accordingly, a purchaser or holder of memorabilia kit 10 has a mechanism by which to verify the authenticity of the signature of the individual signing the article 20, namely, by playback of the real-time recording taken when the individual signed article 20. As described in greater detail below, it is preferred that the recording includes both the appearance of the individual when signing the article 20, as well as the series number and/or the unique identification code presented on the article. Additionally, as also described in greater detail below, it is preferred that the recording be edited to include readable information indicative of the particular article signed. The readable information is thus viewed upon playback of the recording, as illustrated in FIG. 4.

As illustrated, the memorabilia kit also preferably includes a writing utensil, such as an ink pen, denoted by reference numeral 32. Particularly, insert 18 forms a recessed channel in which the writing utensil 32 rests. In accordance with an aspect of the present invention, and as described in greater detail below, the article 20, which has been signed by a notable individual, namely "John Doe", is preferably signed with the actual writing utensil 32 provided in memorabilia kit 10. In this regard, and in accordance with an aspect of the invention, writing utensil 32 may also have indicia or data imprinted thereon representative of the name of the individual autographing the article 20 (e.g., "John Doe"), the series number associated with the article 20, the unique object identification code associated with the article 20, and possibly other information of interest, such as the date and location in which the signing took place, as well any particular affiliation a signator may have with a particular organization or event. For example, in the case where the notable individual autographing the article 20 is an athlete, names, logos, and illustrations associated with that athlete's team may be placed on the writing utensil 32, the signed article 20, the case 12, and/or the label 38 of the storage media 36.

Accordingly, memorabilia kit 10 provides an originally signed article 20 with a storage media 36 which includes a recorded video of the actual signing event, to provide a mechanism by which to verify the authenticity of the signature. It should be understood and appreciated that the present invention is in no way limited to the preferred memorabilia kit illustrated and, in fact, the memorabilia kit 10 will vary widely in practice. For example, the particular articles signed or autographed by an individual will vary widely in accordance with the principles of the invention, and may include posters, photographs, artwork, clothing, sporting items, a label of any type, or any other conceivable article which could be signed or autographed. Accordingly, the case 12, which provides a convenient housing for the particular article 20 illustrated in FIG. 1, may not always be practical.

Figure 2:
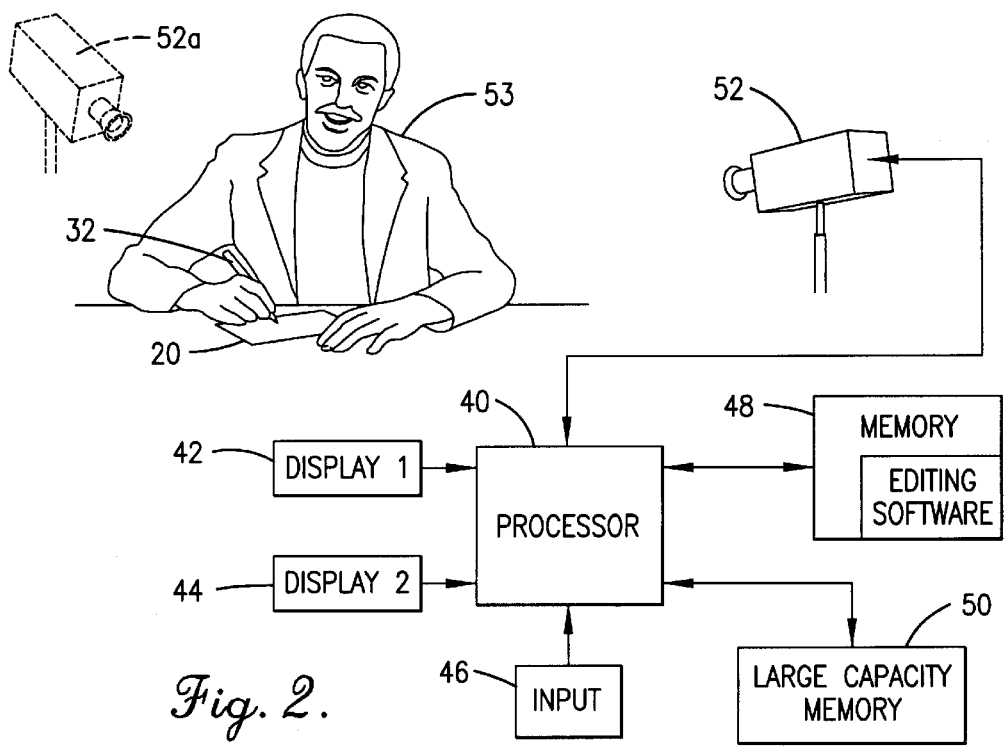
FIG. 2 is a block diagram of a preferred signature authentication system of the present invention.

With reference now to FIG. 2, a block diagram of a preferred signature authentication system of the present invention is illustrated and described.

A signature authentication system of the present invention includes a processor 40. Connected to the processor 40 are first and second displays 42, 44, respectively, an input 46, such as a keyboard, a memory 48, for storing editing software and other application software required by the authentication system, and a large capacity memory 50 for storing recorded audio and video signals. Additionally, a camera 52 is connected to processor 40. As should be fully understood, more than one camera 52 can be utilized, if necessary, for capturing different angles and/or subject matter associated with the signing event of an article, as illustrated by the additional camera 52a shown in broken lines.

In accordance with the principles of the present invention, the authentication system is set up to capture a real-time video recording of an individual 52, as he or she is originally signing or autographing the article 20 with the writing utensil 32. Preferably, the camera 52 is positioned so as to capture a sufficient amount of individual 52 to make the identity of the individual evident. Additionally, the recording preferably captures the article 20, the hand of the individual, the writing utensil 32 while signing is taking place, and other unique aspects of the article 20, such as the series number and identification code. In this way, a holder of the signed article 20 has, in conjunction with the recording, a mechanism by which to confirm the authenticity of the signed article with a high degree of certainty. As necessary, one or more additional cameras, such as camera 52a, can be positioned to capture close ups of the individual or, as illustrated, the article 20, the hand of the individual, and the writing utensil during signing of the article 20.

As will be appreciated, the hardware displayed in FIG. 2 can take the form of any conventional video recording and editing equipment. In this regard, it should be understood that the present invention is not limited to the specific hardware illustrated, but rather that the hardware illustrated in FIG. 2 is representative of one preferred embodiment of the invention for recording video (and associated audio) associated with the signing of an article 20. In this regard, camera 52 may utilize an analog platform or digital platform. Known analog platforms include, but are not necessarily limited to, VHS, SVHS, HI-8, ¾ inch, and BETA CAM. As desired, camera 52 can be an electronic news camera, often referred to as an ENG camera, with one or more video decks built directly into the camera. Alternatively, camera 52 can utilize a digital platform, such as a digital BETA CAM, or a DV video camera.

In the embodiment shown, camera 52 is preferably of a type which utilizes a digital format and sends a signal representative of that which is being recorded to processor 40 for storage in the large capacity memory 50. The software for editing the data stored in the large capacity memory 50 is stored in memory 48, and can be utilized by processor 40, upon control of an operator through the input 46 to edit the data as desired. As will be readily understood and appreciated, the system preferably employs first and second displays 42, 44, thus permitting an operator, during editing functions, to display both a raw recording, as well as edited content, and to permit the operator to more easily make editing selections.

Although the preferred embodiment of the present invention employs a video camera 52 for capturing and recording real time video of the individual 52 signing article 20, in an alternate embodiment of the present invention, camera 52 is of a type for taking still shots of the individual 52 when signing article 20. In such an embodiment, it is still preferred that the image captured by camera 52 captures enough subject matter to permit a holder of the photograph that is taken to easily and quickly confirm that the individual 52 is signing a particular article 20.

Figure 3:
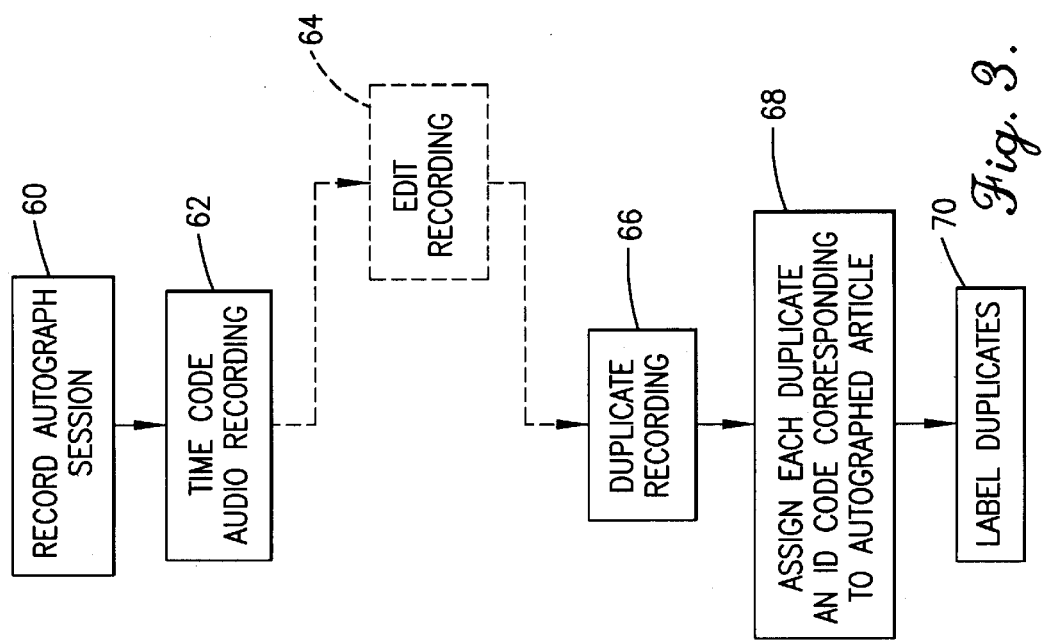
FIG. 3 is a flow diagram illustrating the preferred method steps for authenticating a signature according to the present invention.

With additional reference to FIG. 3, a method of the present invention and, particularly, a method for capturing or recording an image of the individual signing an article is illustrated and described.

During utilization of the authentication system illustrated in FIG. 2, an operator records an autograph session in accordance with the preferred principles of the present invention, as denoted generally at step 60 of FIG. 3. In the preferred embodiment in which the camera 52 captures a real time video, recording of the autograph session is accomplished by camera 52 generating a signal that is sent to processor 40 and stored in large capacity memory 50. In accordance with the principles of the present invention, audio may be simultaneously recorded. As indicated at step 62 of FIG. 3, a time code according to the Society of Motion Picture and Television Engineers, often referred to as a SMPTE Code, is placed on the audio tract of the recording. Particularly, a unique identifier, as part of the SMPTE Code, is placed on each frame of the video, so that each frame has its own unique signature. As will be understood and appreciated, the code and audio code, and is machine readable by a converter, or, in the system illustrated, processor 40 which includes the necessary functions and features to read the SMPTE time code.

As illustrated at optional step 64, the recording captured by camera 52 may be edited by an operator utilizing input 46 to access and contact editing software stored in memory 48. FIG. 3 illustrates the editing steps in dashed lines to indicate that it is an optional step, and that, if desired, the operator can choose to avoid editing the raw video data collected. As will be understood, the video recording can be edited as desired to make for a more presentable appearance. Those with skill in the art will recognize that an operator typically accomplishes video editing by generating a decision list which controls the selection of frames to be included in, or taken out of, a final version of the recording. Once the decision list is created, a master list may be generated for the purpose of assembling a master, finally edited recording. The actual editing that takes place with respect to the real time video captured during an autograph session will obviously vary depending upon the circumstances. However, in accordance with an aspect of the invention, it is preferred that, at a minimum, an operator edit the recording to burn onto the storage media upon which the video recording is stored, an identification code associated with the signing event taking place. In this regard, the identification code electronically burned onto one or more frames of the video recording associated with the particular signing event may be the SMPTE time code utilized in conjunction with the audio tract. Additionally, or alternatively, the video recording can be edited, by the electronic "window burning" described, or by other editing techniques, to present, upon playback of the recording, the unique identification code 30 placed on the actual article 20 being signed. Additionally, the video recording is preferably edited in a similar manner to include on the recording, for viewing for playback of the recording, the actual series number of the article being signed. Accordingly, as illustrated in FIG. 4, upon playback of the recording of the individual 52 originally signing the article 20, the number of the series ("#76"), and the unique identification code 30 associated with the article 20, and appearing on the article 20, are also displayed on the video playback. As a result of these additional unique features, it become very difficult, if not impossible, to fraudulently copy and disseminate a non-authentic article.

In accordance with typical procedures of an autograph session, an individual, such as individual 52, signs in rapid succession a number of articles in a series of articles. Accordingly, in accordance with one method of the present invention, the entire autograph session is captured by a real time video recording with camera 52, and stored in large capacity memory 50. As will be understood in view of the foregoing, any editing can include editing those frames of the video associated with the signing of a particular numbered article to include information pertaining to that article, such as the series number and/or a unique identification code associated with that signed article. Thus, upon playback of the entire video, as the individual 52 is shown signing a number of articles, information will be provided to the viewer in the form of data indicative of the number in the series, and/or the unique identification code.

As illustrated at step 66 of FIG. 3, once the video recording is captured, and edited as desired, the recording is preferably duplicated. Particularly, the number of duplicates generated is consistent with the number of articles signed during the autograph session. As indicated at step 68, each duplicate is assigned an identification code corresponding to the autographed article, and, as previously described, that identification code is located on the label, preferably along with the series number of the article, as illustrated in FIG. 1. Additionally, and in accordance with an important aspect of the invention, a data base is maintained in memory 48 for storing pertinent information pertaining to the autograph session, including the recorded image, the name of the individual 52 signing the articles, the number and nature of the articles signed, the date and location of the signing, and the unique identification code associated with each article. Accordingly, as a further authenticity and verification feature of the present invention, a holder of the originally signed articles 20 can access the central data base, to confirm details of the actual signing event of the particular article he or she is holding. Thus, for example, the holder of an originally signed article, bearing either a unique identification code, or a series number, or both, may access the central data base, such as could be made available through a communications network, and enter information he or she has available pertaining to the article he or she is holding. By accessing the data base, the operator may retrieve information which will include any of the information stored in the data base. Particularly, the user may retrieve and view the real-time recording and all related information associated with the information input by the user. Alternatively, in the embodiment in which the image of the signing event is a still photo, the still photo of the signing event associated with the particular article held by the user can be retrieved.

As indicated at step 70 of FIG. 3, each duplicate, and particularly the storage medium upon which the duplicate recording is stored, is labeled. As illustrated in FIG. 1, the label 38 of the storage medium 36 preferably includes indicia indicative of the number of the series of the particular article signed, and the unique identification code of the particular article signed. Accordingly, as used herein, associating an image of an individual signing an article with the signed article encompasses placing the image in proximity to the article, such as in case 12, and/or associating an image of the signing event with the article by making the image available electronically, whether from a storage medium provided to the holder of the article, or from a remote data base, and/or associating the article and image by applying a common, unique identifier to each.

With additional reference to FIG. 4, playback of a real time recording of an autograph session captured according to the principles of the present invention is illustrated. As illustrated, playback of the recording permits viewing of the individual 52 when actually signing the article 20, and furthermore includes readable information pertaining to the series number ("#76"), and the unique identification code for the signed article. Accordingly, as illustrated in FIG. 4, the series number and unique identification code are provided on the video recording and viewed upon playback, are located on the signed article 20, and are also located on the label 38 of the storage medium 36. Again, as will be understood and appreciated, it is preferred that both the series number and the identification code are provided, although neither or only one of these may be placed on the various components. For example, authentication can occur by virtue only of the fact that a real time video of the individual signing the article is available, and that it is possible to ascertain from the real time video that the particular article in question is the article being signed on the video. The addition of a series number and unique identification code, not only on the article signed, but located in machine readable form on the recording, and on any label utilized on the storage medium, make forgeries all the more difficult, if not impossible.

Accordingly, the present invention provides a unique memorabilia kit, and a system and method for authenticating originally signed articles. In addition to the foregoing, additional data associated with the particular individual signing an article can be stored in memory 48, and associated with the recording of the signing event. For example, an athlete's statistics, real time video recordings of an athlete, can be associated with the signed article and/or the recording of the signing event and provided on the storage medium associated with the article, or provided in a data base for viewing from a remote location. As another example, when the individual signing the article is a movie star, information pertaining to that individual stored in association with the recording of the signing event, or the article signed, and real time video clips of movies or dramas in which the individual appeared can be provided.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method comprising:

providing an article to be signed;

having a desired individual originally sign said article;

recording a real time video image of the individual and said article when the individual is originally signing said article, whereby said image evidences that said article was signed by the desired individual.

2. The method as set forth in claim 1, further comprising:

associating said image with said signed article.

3. The method as set forth in claim 2, wherein said step of associating comprises:

providing a package in which both of said image and said article are contained.

4. The method as set forth in claim 2, wherein said step of associating comprises:

applying a common identifier to each of said article and said image.

5. The method as set forth in claim 2, wherein said step of associating comprises:

electronically storing data indicative of said signed article and said image in conjunction with each other.

6. The method as set forth in claim 1, further comprising the steps of:

placing said image on a medium;

placing a common, unique identifier on said medium and also on its associated article.

7. The method as set forth in claim 6, wherein said real time video image is comprised of a plurality of sequential frames, and wherein said medium is a storage medium for storing said real time video image, said method further comprising encoding at least one of said frames with said unique identifier, whereby, upon playback of said real time video image on a display, said identifier encoded on said video image is displayed.

8. The method as set forth in claim 1, wherein said step of recording an image comprises recording an image of the signing of said article by said individual.

9. A method comprising:

providing a plurality of articles to be signed;

applying a unique identifier to each said article such that each article has its own unique identifier distinct from the identifier of each other article;

having a desired individual originally sign each said article during an autograph session;

capturing a real time image of the desired individual signing each said article;

storing said captured image on a storage medium, wherein said captured image comprises a plurality of successive frames, wherein said frames include selected subsets of frames corresponding to the signing of each said article; and encoding at least one of said frames in each subset of frames with the unique identifier corresponding to the said article captured in the subset of frames.

10. A method comprising:

providing an article to be signed;

having a desired individual originally sign said article;

recording a real time video image of the individual and said article when the individual is originally signing said article, whereby said image evidences that said article was signed by the desired individual, wherein said article is a storage medium and said real time video image is stored on said storage medium.

* * * * *

(12) EX PARTE REEXAMINATION CERTIFICATE (5357th)
United States Patent
DeFabio, Jr.

(10) Number: US 6,250,549 C1
(45) Certificate Issued: Apr. 25, 2006

(54) METHOD FOR AUTHENTICATING SIGNATURES AND MEMORABILIA KIT EMPLOYING SAME

(75) Inventor: Daniel J. DeFabio, Jr., 6012 N. Clinton La., Gladstone, MO (US) 64119

(73) Assignee: Daniel J. DeFabio, Jr., Gladstone, MO (US)

Reexamination Request:
No. 90/006,172, Jan. 24, 2002

Reexamination Certificate for:
Patent No.: 6,250,549
Issued: Jun. 26, 2001
Appl. No.: 09/098,867
Filed: Jun. 17, 1998

(51) Int. Cl.
*G06F 5/00* (2006.01)

(52) U.S. Cl. .................. 235/380; 235/382; 235/375; 382/119; 348/161; 340/5.86

(58) Field of Classification Search .......... 235/375, 235/380, 382, 382.5, 487; 902/1, 6, 22, 23, 902/37, 41; 283/72, 67, 74, 86, 70, 77, 117; 386/95; 382/119, 232, 115; 348/143, 161, 348/150, 153; 340/5.41, 5.53, 5.83, 5.86; 427/7; 713/176, 200; 705/64, 25; 434/307 A, 434/307 R, 318
See application file for complete search history.

(56) References Cited

U.S. PATENT DOCUMENTS

| | | | | |
|---|---|---|---|---|
| 3,798,603 A | * | 3/1974 | Wahlberg | 340/5.41 |
| 4,845,636 A | * | 7/1989 | Walker | 705/26 |
| 4,991,008 A | * | 2/1991 | Nama | 348/150 |
| 5,422,468 A | * | 6/1995 | Abecassis | 235/380 |
| 5,491,511 A | * | 2/1996 | Odle | 348/153 |
| 5,602,933 A | * | 2/1997 | Blackwell et al. | 382/119 X |
| 5,745,604 A | * | 4/1998 | Rhoads | 382/232 |
| 5,751,346 A | * | 5/1998 | Dozier et al. | 348/153 |
| 5,920,338 A | * | 7/1999 | Katz | 348/150 |
| 6,082,774 A | * | 7/2000 | Schlauch | 283/67 |
| 6,309,690 B1 | * | 10/2001 | Brogger et al. | 427/7 |
| 2001/0033676 A1 | * | 10/2001 | Noyes | 382/119 |
| 2002/0122574 A1 | * | 9/2002 | Morgan | 382/119 |
| 2002/0178363 A1 | * | 11/2002 | Ambrogio et al. | 713/176 |

FOREIGN PATENT DOCUMENTS

| | | | |
|---|---|---|---|
| JP | 62-209785 A | * | 9/1987 |
| WO | WO 01/88884 A1 | * | 11/2001 |

OTHER PUBLICATIONS

Chemical Heritage, vol. 15 No. 1, fall 1997, p. 11.*
Http://www.coldwarartifact.com, pp. 1–3, printed Sep. 17, 2001, original posting date unknown.*
Internet site, www.historyplace.com. Select portions. Numbered pp. 1–33. Particular notice made to: www.historyplace.com/worldwar2/timeline/sign/htm.*

* cited by examiner

Primary Examiner—Jared J. Fureman

(57) ABSTRACT

A system and method for authenticating a signature on an originally signed article employs at least one camera for capturing an image of an individual when actually signing the article. In one embodiment, the image is a real-time video image, and in another embodiment, the image is a still photo. The images associated with the signed article, so that a holder of the article has a mechanism by which to authenticate the signature. Preferably, the signed article has a unique identifier located thereon, and the image is preferably edited to also include that identifier. A memorabilia kit, containing an originally signed article, a storage medium having stored thereon a captured image of an original signing event associated with the article, is also provided. Additionally, a captured image and data indicative of the signed article are stored electronically in association with each other, such as on a storage medium made available to a holder of the signed article, or in a data base which is accessible remotely.

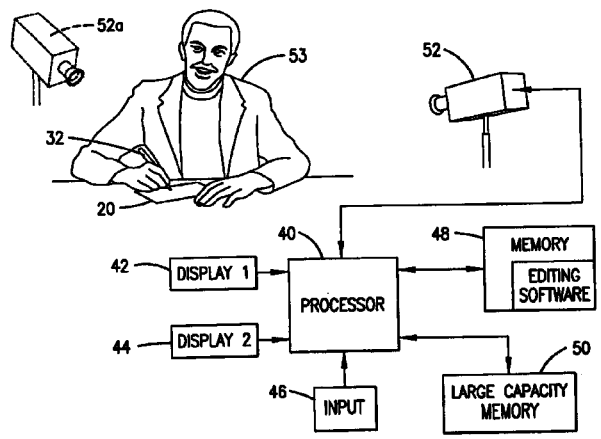

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 9 is confirmed.

Claims 2, 3 and 8 are cancelled.

Claims 1, 4, 5 and 10 are determined to be patentable as amended.

Claims 6 and 7, dependent on an amended claim, are determined to be patentable.

New claims 11–28 are added and determined to be patentable.

1. A method comprising:
   providing an article to be signed;
   having a desired individual originally sign said article;
   recording a real time video image of the individual and said article when the individual is originally signing said article, *wherein said real time video image comprises successive frames,* whereby said image evidences that said article was signed by the desired individual;
   associating said image with said signed article; and
   *wherein said step of associating comprises providing a package in which both of said image and said article are contained.*
4. The method as set forth in claim [2] *1*, wherein said step of associating comprises:
   applying a common identifier to each of said article and said image.
5. The method as set forth in claim [2] *1*, wherein said step of associating comprises:
   electronically storing data indicative of said signed article and said image in conjunction with each other.
10. A method comprising:
    providing an article to be signed;
    having a desired individual originally sign said article;
    recording a real time video image of the individual and said article when the individual is originally signing said article, *wherein said real time video image comprises successive frames,* whereby said image evidences that said article was signed by the desired individual, wherein said article is a storage medium and said real time video image is stored on said storage medium.
11. *The method as set forth in claim 9, wherein a memorabilia kit is provided that includes at least one the signed articles and the storage medium on which is stored the real time image of the individual signing the article.*
12. *The method as set forth in claim 10, wherein a memorabilia kit is provided that includes the signed article that is the storage medium.*
13. *A method comprising:*
    *providing an article to be signed;*
    *having a desired individual originally sign said article;*
    *recording a real time video image of the individual and said article when the individual is originally signing said article for later viewing of the individual signing said article, wherein said real time video image comprises successive frames, whereby said image evidences that said article was signed by the desired individual;*
    *storing said real time video image comprising successive frames on a storage medium for subsequent authentication of the individual signing said article;*
    *associating said image with said signed article, wherein said step of associating comprises applying a common identifier to each of said article and said image; and*
    *wherein a purchaser of the article may view the image to authenticate the signature on the article.*
14. *The method as set forth in claim 13, wherein a memorabilia kit is provided that includes the signed article and a storage medium having stored thereon the real time video image of the individual signing the article.*
15. *A method comprising:*
    *providing an article to be signed;*
    *having a desired individual originally sign said article;*
    *recording a real time video image of the individual and said article when the individual is originally signing said article, wherein said real time video image comprises successive frames, whereby said image evidences that said article was signed by the desired individual;*
    *associating said image with said signed article, wherein said step of associating comprises electronically storing data indicative of said signed article and said image in conjunction with each other; and*
    *wherein a purchaser of the article may view the image to authenticate the signature on the article.*
16. *The method as set forth in claim 15, wherein a memorabilia kit is provided that includes the signed article and a storage medium having stored thereon the real time video image of the individual signing the article.*
17. *A method comprising:*
    *providing an article to be signed;*
    *having a desired individual originally sign said article;*
    *recording a real time video image of the individual and said article when the individual is originally signing said article, wherein said real time video image comprises successive frames, whereby said image evidences that said article was signed by the desired individual;*
    *placing said image on a medium;*
    *placing a common, unique identifier on said medium and also on its associated article; and*
    *wherein a purchaser of the article may view the image to authenticate the signature on the article.*
18. *A method comprising:*
    *providing a plurality of articles to be signed;*
    *applying a unique identifier to each said article such that each article has its own unique identifier distinct from the identifier of each other article;*
    *having a desired individual originally sign each said article during an autograph session; recording a real time video image of the desired individual signing each* said article, wherein said real time video images comprises successive frames; and associating said image or a reproduction thereof with each of said signed articles.

19. The method as set forth in claim 18, wherein said step of associating said image or a reproduction thereof with each of said signed articles comprises at least one of:

providing a package in which both of said image and said article are contained;

applying a common identifier to each of said article and said image;

applying a common identifier to each of said article and a storage medium associated with said image; and electronically storing data indicative of said signed article and said image in conjunction with each other.

20. The method as set forth in claim 18, wherein a memorabilia kit is provided that includes at least one of the signed articles and a stored medium have stored thereon the real time video image of the individual signing the article.

21. A method comprising:

providing a plurality of articles to be signed;

applying a unique identifier to each said article such that each article has its own unique identifier distinct from the identifier of each other article;

having a desired individual originally sign each said article during an autograph session;

recording a real time video image of the desired individual signing each said article, wherein the real time video image is comprised of successive frames that may be viewed for later authentication of the individual signing said article;

storing said real time video image comprising successive frames on a storage medium; and associating at least that portion of said real time image corresponding to a particular one of said signed articles with the signed article that is captured in that portion of the image.

22. The method as set forth in claim 21, wherein said step of associating comprises at least one of:

providing a package in which both of said image and said article are contained;

applying a common identifier to each of said article and said image applying a common identifier to each of said article and a storage medium associated with said image; and electronically storing data indicative of said signed article and said image in conjunction with each other.

23. The method as set forth in claim 21, wherein a memorabilia kit is provided that includes at least one of the signed articles and a storage medium having stored thereon the real time video image of the individual signing the article.

24. A method comprising:

providing an article to be signed;

having a desired individual originally sign said article;

recording a real time video image of the desired individual and said article when the desired individual is originally signing said article, wherein said real time video image is comprised of successive frames for later viewing of the individual signing said article, whereby said image evidences that said article was signed by the desired individual;

storing said real time video image comprising successive frames on a storage medium;

associating said image with said signed article, wherein said step of associating is selected from the group consisting of: providing a package in which both of said image and said article are contained; applying a common identifier to each of said article and said image; and electronically storing data indicative of said signed article and said image in conjunction with each other; and wherein a purchaser of the article may view the image to authenticate the signature on the article.

25. A method comprising:

providing a plurality of articles to be signed;

having a desired individual originally sign each said article during an autograph session;

recording a real time video image of the desired individual signing each said article, wherein said real time video image is comprised of successive frames;

storing said recorded real time video image on a storage medium, wherein said successive frames include selected subsets of frames corresponding to the signing of each said article; and associating at least the selected subsets of frames corresponding to a particular one of said signed articles with the signed article that is captured in the selected subset of frames.

26. The method as set forth in claim 25, wherein a memorabilia kit is provided that includes at least one of the signed articles and a storage medium having stored thereon the real time video image of the individual signing the article.

27. A method comprising:

providing a plurality of articles to be signed;

applying a unique identifier to each said article such that each article has its own unique identifier distinct from the identifier of each other article;

having a desired individual originally sign each said article during an autograph session; and capturing a real time video image of the desired individual signing each said article, wherein said real time video image comprises successive frames, wherein said captured image evidences that said article was signed by the desired individual, such that said article and the unique identifier placed thereon can be viewed in said captured image.

28. The method as set forth in claim 27, wherein a memorabilia kit is provided that includes at least one of the signed articles and a storage medium having stored thereon the real time video image of the individual signing the article.

* * * * *